Dec. 3, 1957  W. D. O'MORROW  2,814,842
PLASTIC STRUCTURAL MEMBERS AND METHOD FOR MAKING
Filed Dec. 21, 1954
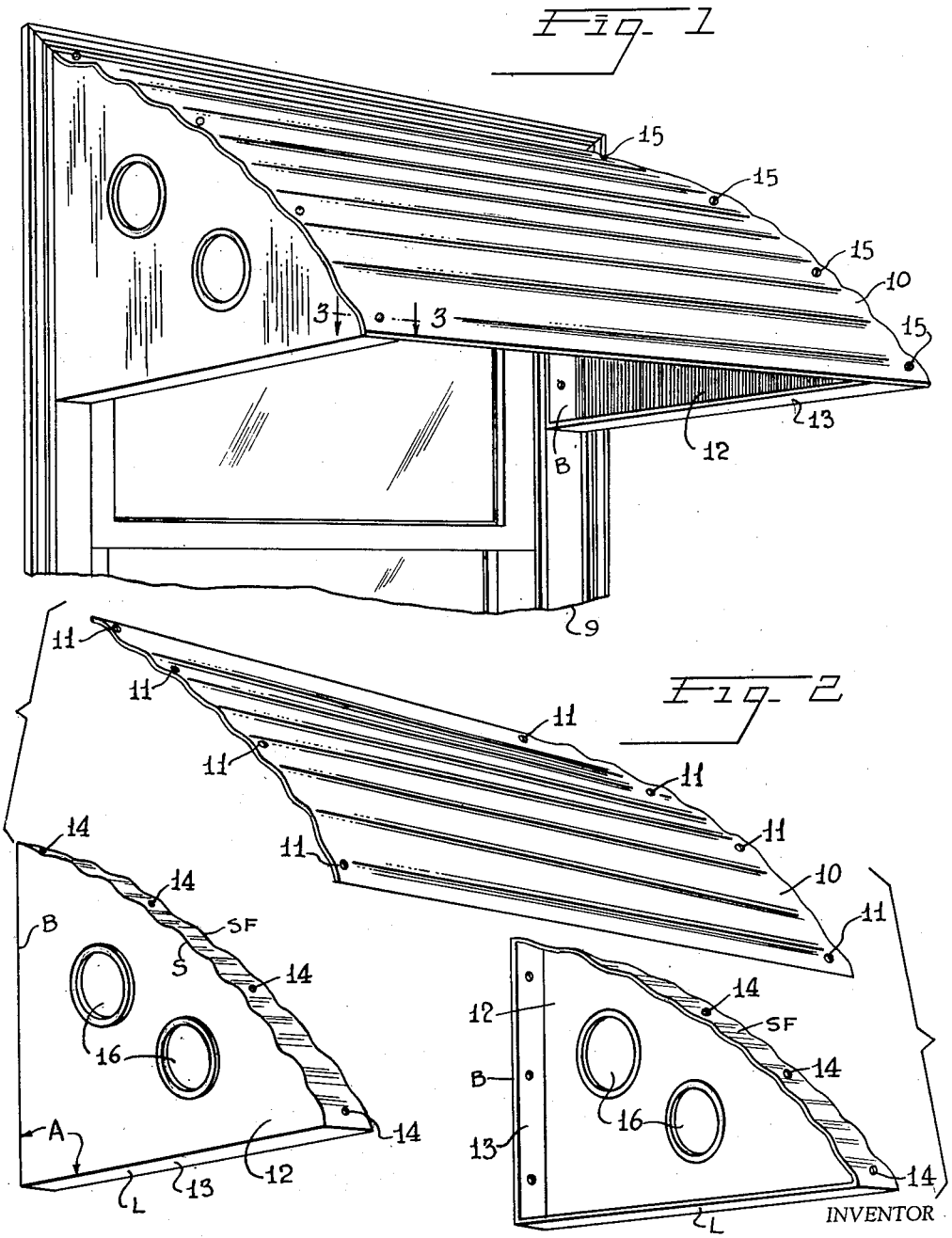
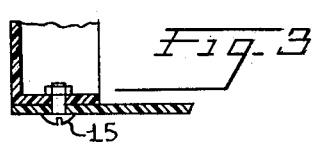
INVENTOR
WILLIAM D. O'MORROW
BY Beale and Jones
ATTORNEYS

United States Patent Office 2,814,842
Patented Dec. 3, 1957

2,814,842

PLASTIC STRUCTURAL MEMBERS AND METHOD FOR MAKING

William Donald O'Morrow, La Jolla, Calif., assignor to Chemiglas, Inc., San Diego, Calif., a corporation of California Application December 21, 1954, Serial No. 476,619

3 Claims. (Cl. 20—57.5)

This invention relates to a new structure for a window awning and a method of forming the structure.

More particularly, this invention relates to a novel type of structure, and a method of making it, the structure being a shelter such as a window awning in which each major structural component is made from a reinforced plastic material. Specifically, the plastic material may be one which is reinforced with fiberglass.

Although many types of awnings are known to the applicant, none is known in which all of the major structural components are made exclusively of reinforced plastic. This material is so light in weight as to be misleading as to its true strength. Structural components made of this type of material possess excellent strength characteristics and are sufficiently rigid to withstand the most rugged types of weather. Furthermore, plastics of this general type may be tinted in any decorative colors desired. The tinting may desirably be such as to provide translucent panels, although opaque panels may be produced also.

While the reinforced plastic materials employed in the present invention possess great strength and other desirable characteristics, it is nevertheless essential to employ techniques not heretofore known in the art in order to produce an awning structure in which the weight of the major structural components is at a minimum, while the most complete advantage has been taken of the inherent strength characteristics of the plastic materials. Furthermore, such techniques must be combined with beauty of design in order to produce a product which is attractive in appearance.

Accordingly, it is an object of the present invention to provide a new type of awning structure and a method of making it, the structure having a minimum number of major structural components, a pleasing appearance, and sufficient strength to withstand all types of weather.

More specifically, it is an object of the present invention to provide a strong, rigid, translucent, tinted awning of fiberglass reinforced plastic in which the major structural components comprise a pair of supporting brackets and a relatively flat, slightly resilient sheet of corrugated, translucent fiberglass reinforced plastic sheeting, and a method of assembling these components.

These and other objects of the invention are achieved by providing a pair of supporting brackets for a corrugated sheet which may be of stock size. The two supporting brackets are desirably mirror images of each other. Each bracket comprises a relatively flat web portion and a reinforcing peripheral flange extending continuously around the periphery on one face of the web. Each bracket is desirably of generally triangular shape, with one side thereof being undulated to correspond to the surface of the corrugated sheet. The corrugated sheet, when installed, is bent, and secured to and supported by the undulated reinforcing flange of each awning bracket. One portion of the reinforcing flange of each bracket may be secured to the window framing.

The invention may be more clearly understood by specific reference to the drawings appended hereto, in which:

Fig. 1 is a perspective view of an installed awning;

Fig. 2 is an exploded perspective view of the awning; and

Fig. 3 is a sectional view taken on line 3—3 of Fig. 1.

Referring now to the drawings in detail, the largest single component in the awning structure of the present invention is usually, but not necessarily, the corrugated sheet 10. The awning structure of the present invention is particularly adapted for sale through retail outlets in the form of a kit, for installation by homeowners. However, the kit form of package is convenient for all types of installations, including multiple installations in large scale building projects including apartment units. For such purposes, the corrugated sheet may be provided with a number of apertures 11 at selected locations for the passage therethrough of fasteners for securing the corrugated sheet to the support brackets. While it is often convenient to punch or drill these apertures in the corrugated sheet during its production, the same length of sheet may not necessarily be employed for all installations, since window sizes differ. For this reason, it may be advisable to preform the apertures 11 in only one end of the corrugated sheet, or to omit preforming of the apertures entirely.

The corrugated sheet 10 is preferably a standard product which may be shipped in substantially flat condition. The corrugations may be a regular sine wave about a straight line of generation, or may take the form of any other type of regular wave. However, the corrugated sheet should preferably be substantially flat under ordinary conditions for convenience in packaging, shipping, and handling.

In the preferred form of the invention, the corrugated sheet 10 is made of a tinted, fiberglass reinforced plastic. Many processes are known today for the production of such plastics. They are desirably translucent for the present purpose, but may be opaque if desired. More specifically, the preferred type of plastic sheeting is made by the low-pressure continuous molding of a fiberglass reinforced polyester resin. Plastics of this type may be tinted in a wide array of beautiful colors, which is of considerable commercial importance. Furthermore, plastics of this type have unusually high strength characteristics in proportion to their weight. However, while the strength characteristics of this type of plastic are highly desirable, it has been found that the corrugated sheets of this plastic are sufficiently resilient to withstand a slight curvature. Furthermore, it has been found that such a curvature enhances the rigidity of the material. While applicant does not completely understand the theoretical reasons for this observed increase in rigidity and strength, it appears highly probable that imparting a slight curvature to the sheet by forcing or bending the sheet as permitted by this resiliency tends to place the glass fibers under tension. This appears to enhance their reinforcing characteristics to an unexpected degree. This supplements the added rigidity which is due to the curvature.

The supporting brackets for the awning of the present invention may take many forms. A preferred embodiment of the invention is illustrated in the drawings. As therein illustrated, each supporting bracket comprises a relatively flat web portion 12. This relatively flat web portion 12 is desirably reinforced by a flange 13 extending continuously around the entire periphery of the web portion of the bracket, and normal to the surface thereof. In order to achieve maximum strength in the bracket, the reinforcing flange 13 should be an integral part of the web. When the awning support bracket is produced by molding processes, the reinforcing flange 13 is merely formed as an integral part of the web by techniques common in the plastics industry. One portion of the reinforcing flange B is adapted to be secured to a framing support member, such as the wooden window framing 9 illustrated in Fig. 1. This side B of the bracket has a substantially smooth surface for direct contact with the framing support member. This side B of the bracket 12 makes an angle A with the lowermost surface L of the bracket which is desirably in the neighborhood of 90°. However, while the angle A has been shown in the drawings to be 90°, it should be understood that this angle may be either more or less than 90°, depending upon the width of the corrugated sheet employed, and the design which has been selected.

Each support bracket 12 is generally triangular in shape, with the side of the support bracket opposite the angle A functioning as the direct support member for the corrugated sheet. This side S of the web is undulated to conform with the surface of the corrugated sheet 10. The same undulations are continued in the surface SF of the reinforcing flange. This undulated surface SF is desirably provided at the factory with preformed apertures 14 for the reception of fasteners 15 which secure the corrugated sheet to the support bracket.

While it is possible to construct the support brackets with the surface SF of the supporting flange being undulated about a substantially straight line which forms the third side of the triangle, it has been found preferable to form this surface along an arc of a circle having a radius much greater than the length of either side of the bracket. Thus the surfaces SF of the supporting flanges are in the shape of segments of a cylinder having undulations in the surface thereof. In the preferred form of the invention as illustrated in the drawings, the supporting flange surface SF is in this arcuate form, with the undulations being arranged about a segment of an arc which connects the other two sides of the substantially triangular web. When the surface SF of this supporting flange is arcuate, the desired increase in rigidity and strength of the fiberglass reinforced plastic panel 10 is obtained when it is secured to a pair of these brackets, for reasons previously discussed. Stated another way, after the resilient corrugated sheet is secured to conform to the arcuate, undulated surfaces SF of the bracket flanges, the panel or sheet 10 is held in place by these brackets so that it assumes the shape of a segment of a generally cylindrical surface, as defined by an arc of the generally circular generatrix.

A major reason for failure in awning structures in the past has been breakdown caused by excessive horizontal fluid pressures. Sudden gusts of wind, or continued winds of high velocity, can exert tremendous aerostatic pressures on a flat vertical surface such as that presented by each awning bracket 12. For this reason, and also in order to enhance the appearance of the brackets, it is desirable to provide some means for decreasing horizontal fluid pressures. This may be readily accomplished by providing each bracket with one or more apertures 16 which decrease the effects of horizontal wind pressures. While these apertures have been indicated in the drawings as being circular in form, it should be understood that the applicant does not confine himself thereto, but that diverse other aperture shapes may be employed, provided that the basic purpose of reducing horizontal wind pressure is satisfied. Thus, the aperture may be substantially triangular in shape, corresponding generally to the outline of the bracket itself. Alternatively, common shapes such as diamonds, ovals, or a plurality of small circles, may be employed.

The arcuate surface SF of the supporting flange fulfills other desirable functions in addition to increasing the rigidity of and for supporting the corrugated sheet. Thus, the general curvature which is imparted to the corrugated sheet is such as to facilitate runoff of rain water and falling snow. Because runoff is facilitated, the occasional cleaning which may be given to these awnings is also made easier.

While it is desirable in most cases that the angle A opposite the undulated supporting surface of the awning bracket be a right angle, in some climates, and for some exposures, it may be desirable to use a relatively shallow awning, so that the angle A may be as little as 60°, or even less. On the other hand, where a considerable amount of shading is desired, the angle A may be more than 90°. However, in the preferred form of the invention, the angle A is 90°. This type of awning bracket would appear to have the greatest general utility. In every case, it will be understood, the width of the corrugated sheet must be modified to match or overlap the supporting flange surface of the bracket.

The method of securing the corrugated sheet 10 to an awning bracket 12 is relatively simple. Where fiberglass reinforced plastic is employed, the fasteners are desirably truss-head, cadmium plated stove bolts with nuts. The relatively flat side of the bracket B may be secured to the wooden framing member 9 by round-head, rustproof wood screws, preferably with attached neoprene washers.

The awning structure above described is readily adapted for sale in the form of a kit. For most homes, a corrugated panel 26 inches wide would be found to be satisfactory. A panel length of 3 feet has been found to be generally useful. To support this panel, awning brackets having a curved supporting surface with a straight arc length of 26 inches may be employed. Such brackets may be in the form illustrated in the drawing, in which the angle A is a right angle. The vertical side B and the lowermost side L of the supporting brackets would then desirably be about 18 inches long. A flange width of about one inch is quite satisfactory, the ratio of the width of the flange to the thickness of the web is approximately 10 to 1, as shown in Fig. 3. To minimize horizontal wind pressure, each awning bracket may be provided with a pair of circular apertures approximately 3 inches in diameter. With component parts of the size just mentioned, there would be needed in addition only 6 wood screws to attach the awning brackets to the window framing, and 8 stove bolts with nuts for securing the corrugated panel to the awning brackets. For window awnings where an extremely long panel is employed, say on the order of 5 or 6 feet, a simple metal center clip (not illustrated) of a conventional kind may be employed for additional strength.

In order to make an installation with a kit of the type just described, a minimum amount of work need be done. Preferably, the screw holes and bolt holes are prelocated and drilled in each awning bracket at the factory. The brackets are first installed at the desired height on the window frame, care being exercised to install each bracket at the same level. Where the brackets must be secured to substances other than wood, such as stucco or brick, longer screws, toggle bolts, or lag screws with suitable plugs may be necessary. In order to create the most pleasing appearance in the awning, the brackets should be installed so that the supporting flanges face each other. After the brackets are secured in position, the corrugated sheet is placed on the brackets' supporting surfaces with the undulations in the brackets matching the corrugations in the corrugated sheet. If the holes are not already made in the panel, the panel may be marked with a pencil or crayon and the holes may be drilled correspondingly. Installation of the awning is completed merely by securing the corrugated panel to the awning brackets with rustproof nuts and bolts.

While the awning structure of the present invention has been described with particular reference to the use of fiberglass reinforced plastic material, it should be understood that many other materials may also be employed. The modern light metals are particularly adapted for use in the present structure. Aluminum having a permanently tinted surface has been found to be quite satisfactory for use as the corrugated panel. Although little, if any, increase in strength is observed when a corrugated panel of aluminum is secured to the arcuate matching undulated surface of the preferred form of awning bracket of the present invention, the arching obtained provides a definite increase of the rigidity of the corrugated panel. This is an entirely unexpected and highly useful characteristic of the structure of the present invention.

While aluminum and other similar modern building materials may be substituted for the fiberglass reinforced plastic materials employed in the preferred form of the invention, the reinforced plastic has the advantage that it is translucent. This is a highly desirable characteristic for homes since it affords protection from direct sunlight without shutting off all the light needed for illumination of the interior. Furthermore, a plastic material is not affected by the elements. When installed as described, the structure of the present invention needs no additional bracing or framework.

The structure above described has particular utility as an awning. On a larger scale, however, entire structures could be fabricated of these components. For example, an inexpensive beach shelter or refreshment stand could be constructed from two large brackets and a correspondingly large corrugated sheet or sheets. Some anchorage for the lower portions of each bracket would be necessary. This could be easily provided by a simple foundation of wooden beams, which could be buried in sand or earth. Such a structure would be strong, light, easy to assemble, and easy to disassemble and move.

I claim:

1. A shelter structure constructed of reinforced synthetic plastic members comprising, in combination, a pair of oppositely facing end brackets and a top corrugated sheet having regular undulations formed therein and attached to said end brackets, each of said end brackets being integrally formed and comprising a vertically extending web of generally triangular shape having two edges meeting at an angle, an arcuate, continuous, regularly undulated margin corresponding to the undulations in said sheet extending in the direction of the plane of the web and opposite said angle and forming the third edge of said generally triangular shaped web, and a peripheral reinforcing flange integral with said web and normal to the surface thereof, said flange having undulations in the portion thereof connected to and corresponding with said third edge of the web, said top sheet being flexed into an arcuate shape and having the undulations thereof resting in the undulations of said reinforcing flange and being attached thereto whereby said undulations of the flange and sheet lock together to form a rigid joint and prevent slippage between said sheet and brackets in the direction of said undulations.

2. A shelter structure according to claim 1 wherein said bracket has the flange thereof of a width ratio to the thickness of said web of the order of approximately ten to one.

3. An end bracket for a shelter structure to support a corrugated top having undulations therein comprising an integrally formed assembly of reinforced plastic consisting of a vertically extending web of generally triangular shape having two edges meeting at an angle, an arcuate continuous, regularly undulated margin corresponding to the undulations in said corrugated top and extending in the direction of the web and opposite said angle and forming the third edge of said generally triangular shaped web, and a peripheral reinforcing flange integral with said web and normal to the surface thereof, said flange having undulations in the portion thereof connected to and corresponding with said third edge of the web and adapted to receive and support and lock thereto a corrugated top and to prevent slippage of the top over the corrugated flange in the direction of said undulations, said flange having a width ratio to the thickness of said web of the order of approximately ten to one.

References Cited in the file of this patent

UNITED STATES PATENTS

| | | |
|---|---|---|
| 2,075,135 | Reynolds et al. | Mar. 30, 1937 |
| 2,584,609 | Owen | Feb. 5, 1952 |
| 2,615,213 | Haslop | Oct. 28, 1952 |
| 2,641,340 | Howe | June 9, 1953 |
| 2,644,207 | McCormack et al. | July 7, 1953 |
| 2,654,424 | Liberatore | Oct. 6, 1953 |
| 2,731,686 | Ball | Jan. 24, 1956 |
| 2,749,580 | Coburn | June 12, 1956 |